United States Patent [19]

Tomo et al.

[11] Patent Number: 4,671,918
[45] Date of Patent: Jun. 9, 1987

[54] APPARATUS AND PROCESS FOR PRODUCING POLYOLEFIN FILM

[75] Inventors: Daniel Tomo, Fairfield; Robert E. Denbo, Lebanon, both of Ohio

[73] Assignee: National Distillers and Chemical Corporation, New York, N.Y.

[21] Appl. No.: 791,496

[22] Filed: Oct. 25, 1985

[51] Int. Cl.[4] .............................................. B29C 47/20
[52] U.S. Cl. .................................. 264/564; 264/209.1; 425/326.1; 425/376 A; 425/380; 425/467
[58] Field of Search ..................... 264/209.1, 564–569; 425/326.1, 380, 467, 376 A

[56] References Cited

U.S. PATENT DOCUMENTS

| | | | |
|---|---|---|---|
| 3,666,390 | 5/1972 | Gerow | 425/380 |
| 3,879,158 | 4/1975 | Schele | 425/326.1 |
| 4,360,494 | 11/1982 | Kurtz | 425/326.1 |
| 4,395,221 | 7/1983 | Herrington | 425/380 |
| 4,473,527 | 9/1984 | Fujisaki et al. | 425/326.1 |
| 4,522,776 | 6/1985 | Ramamurthy | 425/380 |
| 4,552,712 | 11/1985 | Ramamurthy | 425/467 |
| 4,554,120 | 11/1985 | Ramamurthy | 425/380 |

OTHER PUBLICATIONS

"Running the Linear Lows: How to Make the Switch", Plastics Technology, pp. 65–71, Feb. 1981.

Primary Examiner—Jeffery Thurlow
Attorney, Agent, or Firm—Kenneth D. Tremain

[57] ABSTRACT

An apparatus and process for the extrusion of linear low density polyolefins. The apparatus comprises an extruder die including a cylindrically shaped central opening; and a die pin held within the central opening and forming, with the extruder die, an extrusion inlet and an extrusion outlet. The extruder die and the die pin also form a relaxation zone to receive a polyolefin conducted through the extrusion inlet and to relieve stresses in the polyolefin; a compression zone to receive the polyolefin from the relaxation zone and to compress the polyolefin into a tubular shaped film; and a stabilization zone to receive the polyolefin from the compression zone, to stabilize the shape of the tubular film, and to conduct the tubular film to the extrusion outlet.

7 Claims, 3 Drawing Figures

APPARATUS AND PROCESS FOR PRODUCING POLYOLEFIN FILM

BACKGROUND OF THE INVENTION

1. Field of the Invention

The present invention relates generally to an appararus and process for producing film from polyolefin materials and, more particularly, pertains to a novel mandrel which, when incorporated into a blown film die, allows linear low-density polyethylene to be extruded through the die economically, producing a film with improved quality and increased bubble stability.

2. Discussion of the Prior Art

With the advent of the economical production of narrow molecular weight linear lower density polyethylene resins (LLDPE) and the improved properties obtained from this resin, there has been great interest in the extrusion art to successfully, and hence economically, form extruded films therefrom.

The present state of the art related to the production of linear low density polyethylene films (LLDPE) has produced numerous modifications to existing equipment used to produce low density polyethylene film (LDPE) or high density polyethylene film (HDPE).

High pressure low density polyethylene, of broad molecular weight distribution, can be considered "soft" in shear and "stiff" in extension. Ethylene hydrocarbon copolymers having a narrow molecular weight distribution such as (LLDPE) exhibit the opposite rheology. They are "stiff" in shear and "soft" in extension. The terms "soft" and "stiff", as used herein, refer to the relative magnitude of shear and extensional viscosity. In tubular blown film extrusion of LLDPE resins, this property is manifested by reduced melt strength in extension, resulting in a film bubble which is unable to resist deformation caused by the increased cooling required by increased throughput rates. An improved process for extruding film by tubular blown film extrusion of molten, linear ethylene hydrocarbon copolymers having a narrow molecular weight distribution providing improved bubble stability and enhanced film quality has been developed as hereinafter described.

Narrow molecular weight distribution, transition metal catalyzed, ethylene hydrocarbon copolymers have been extruded into film by conventional techniques such as blown film extrusion and slot cast extrusion.

In tubular blown film extrusion, the polymer melt is extruded annularly through a die to form a tube which is expanded to the desired extent, cooled or allowed to cool and flattened by passage through a collapsing frame and a set of nip rolls. A positive pressure of gas is maintained inside the tubular bubble to provide the desired expansion of the tubular film. As the polymer exits the annular die, the extrudate cools, its temperature falls below its melting point, and it solidifies. As the film is so cooled, crystallization occurs, changing the optical properties, and a frost line forms, at a point proximate the annular die by a distance controlled by the cooling rate.

In slot cast film extrusion, the molten polymer is extruded through a slot die and quenched, employing a chill roll or water bath. The optical properties of film so formed are much improved as compared to tubular blown film by virtue of the rapid extrudate cooling rate and resulting rapid crystallization to small spherulites. Higher temperatures may be employed reducing shear stress in the die and raising the threshold for melt fracture. Melt strength is also not a process limitation.

The extrusion of low pressure low density polyethylene affords special difficulties, in that the narrow weight distribution of such resins provides reduced shear thinning behavior at extrusion grade shear rates such that higher pressure and higher power is required during extrusion. Another consequence, as aforementioned, is the poor melt strength developed, requiring modifications in cooling equipment to maintain the stability of the film bubble in tubular extrusion.

When extruded through narrow gap dies the 'linear low' resins generate very high extrusion head pressures. Shear stresses are high and the extrudate tends to melt fracture. Melt fracture refers to the phenomenon in which a resin extrudate becomes rough and nonuniform due to melt instabilities during polymer flow. When the polymer extrudate takes the form of a film, surface distortions, induced by melt fracture can be "frozen-in" as the extrudate cools and solidifies. These surface distortions can seriously detract from the mechanical strength of the film. These shear related problems also severely limit extruder output rate.

It has been found that when the die gap of the extrusion devices used in extruding films from these resins are greater than about 50 mils, extruder output rate can be increased significantly. Drawdown can become quite high. Head pressures, shear stresses in the die, and the tendency of the resin to melt fracture are all reduced. In essence, extensional deformation is substituted for shear deformation, accomodating the "stiff" shear and "soft" extensional rheology of these narrow molecular weight distribution linear ethylene hydrocarbon copolymers.

The problems associated with narrow molecular weight low density linear polyethylene resins is particularly acute when attempting to extrude film through existing apparatus which are configured to extrude low, medium and high density, non-linear polyethylene films. As the state of the present art exists, running LLDPE on unmodified LDPE equipment can result in anywhere from a 20–50% loss in lb/hr throughput. Though downgauging often offsets this drop by yielding comparable linear ft/hr, machinery and resin suppliers are hard at work designing LLDPE equipment that reportedly attains or exceeds LDPE output. It is, of course, possible but impractical and uneconomical to modify process parameters to respond to these disparate resin requirements.

Trying to force LLDPE through an LDPE blown film die raises two immediate problems: (1) system pressures rise because the higher viscosity resin puts up more resistance, and (2) 'sharkskin' or 'applesauce' (surface irregularities) can appear at shear rates that wouldn't normally fracture LDPE. One approach to offsetting higher pressures, is to employ larger die gaps as aforesaid. (However, in tubular blown film processes a wide die gap and low polymer melt strength leave a thick, easily distorted bubble below the frost line).

Computer designed spiral die bodies may be used to minimize the pressure build up exerted on the LLDPE as it passes through the die. See Running the Linear Lows, *Plastics Technology*, February 1981, p. 65–71 by Michael Hartung. Melt fracture may be minimized changing the geometry of the melt passageway, including shortening the land length to 0.25 to 0.50 inch, and providing a constrictor zone to reduce flow variations.

For typical examples of the most recent art see U.S. Pat. Nos. 4,267,146; 4,282,177; 4,321,229, and 4,330,501.

U.S. Pat. No. 4,321,229 discloses an improved method for extruding linear polyolefin materials having high viscosities wherein a novel rotary extruder is provided having a feeding, metering and transition section.

U.S. Pat. No. 4,243,619 discloses a process for making film from low density ethylene hydrocarbon copolymer which comprises extruding the copolymer through a die having a die gap within the range of greater than 50 mils to approximately 120 mils, to provide a film having improved optical and mechanical properties.

U.S. Pat. Nos. 4,267,146 and 4,282,177 also refer to the use of a die gap greater than 50 mils together with a converging or diverging die section to avoid sharkskin melt fracture. It is taught that sharkskin melt fracture can be controlled or eliminated by the geometry at the exit of the die and is independent of die entrance or die land conditions.

U.S. Pat. No. 4,330,501 discloses an improved film bubble cooling technique for low strain hardening polymers such as LLDPE.

Additional related methods and apparatus are disclosed in the following materials.

U.S. Pat. No. 3,382,535 discloses an extrusion die that flares out in trumpet-like fashion towards the discharge orifice, the contours of which conform to a mathematical formula to enhance extrusion of the thermoplastic material without melt fracture. The plastic materials which are extruded are ordinarily sensitive to die taper angles. The mathematical formula is related to the critical shear rate of any selected plastic material, the minimum die radius and the die taper angle.

U.S. Pat. No. 3,914,366 describes a method and apparatus for forming a material in a thermoplastic extrusion die. During the formation of the material in the die, first and second areas of increased wall thickness are formed in the material, the thickened portions only are thereafter progressively decreased in thickness to form a uniform cross-section. The material is then discharged from the die.

U.S. Pat. No. 3,994,654 discloses a die for extruding a thermoplastic sheet having a controlled degree of microsurface roughness. The improvement comprises a beveled leading edge on at least one of the die lips when the bevel is away from the die orifice.

U.S. Pat. No. 4,267,146 describes a method for reducing the melt fracture during extrusion of a molten narrow molecular weight distribution ethylene polymer by extruding the polymer through a die having a die gap greater than about 50 mils and wherein at least a portion of one surface of the die lip and/or die land in contact with the molten polymer is at an angle of divergenece or convergence relative to the axis of flow of the molten polymer through the die.

U.S. Pat. No. 4,348,349 relates to a process for reducing melt fracture formed during extrusion of a molten narrow molecular weight distribution linear ethylene polymer which comprises extruding said polymer through a die having a discharge outlet defining an exit die gap formed by opposing die lip surfaces and wherein one surface of the die lip and/or die land in contact with the molten polymer extends beyond the opposing surface of the die lip and/or die land in the direction of the axis of flow of the molten polymer through the die exit.

U.S. Pat. No. 4,360,494 describes a process for reducing melt fracture formed during extrusion of a molten narrow molecular weight distribution linear ethylene polymer comprising extruding the polymer through a die having a discharge outlet defining an exit die gap formed by opposing die lip surfaces and wherein one surface of the die lip and/or die land in contact with the molten polymer extends beyond the opposing surface of the die lip and/or die land in the direction of the axis of flow of the molten polymer through the die exit and wherein the extended die lip has a groove extending around the extended die lip. The die groove is disposed opposite the leading edge of the opposing die lip surface.

U.S. Pat. No. 4,415,711 describes a process for forming a blown film from a normally solid thermoplastic resin having an extensional viscosity index of less than about six. The resin is extruded through the die lips of a tubular film die to form a molten tube, the molten tube being expanded radially at an angle of at least 45 degrees.

While these improvements permit the utilization of modified LDPE extrusion equipment for processing LLDPE resin, they do not lead to improvements in film quality or bubble stability. Moreover, they do not permit sensible operation of the same equipment for HDPE, MDPE, LDPE and LLDPE resins.

SUMMARY OF THE INVENTION

Accordingly, it is a primary objective of the present invention to provide a novel, improved apparatus and process for the extrusion of low-density linear polyolefin materials to provide film of improved mechanical and optical properties.

Another object of the present invention is to provide an improved process and apparatus for the tubular blown film extrusion of low-density linear polyolefin materials.

A still further object is to provide an effective apparatus and process which will efficiently extrude lowdensity linear polyolefins economically with a minimum of modification to existing machinery.

It is also an object of the present invention to provide equipment adapted to practicably permit the extrusion of HDPE, MDPE, LDPE and LLDPE resins.

The present invention provides a novel apparatus (and related process) for extruding polyolefins by modifying the mandrel therein so as to increase the die gap and to decrease the land length within the die. Further, a relief area is formed within the die so as to provide an area wherein the melt can relax in order to relieve stresses formed within the polyolefin material. Such a specific combination of features provides improved parameters for polyolefin resin extrusion, especially linear low-density, narrow molecular weight distribution polyolefins.

BRIEF DESCRIPTION OF THE DRAWINGS

The foregoing objects, advantages and characterizing features of the inventive method and apparatus of the present invention will become clearly apparent from the ensuing detailed description of an illustrative embodiment thereof, taken together with the accompanying drawings wherein like reference numerals denote like parts throughout the views and in which.

DETAILED DESCRIPTION OF THE PREFERRED EMBODIMENTS

Figure 1:
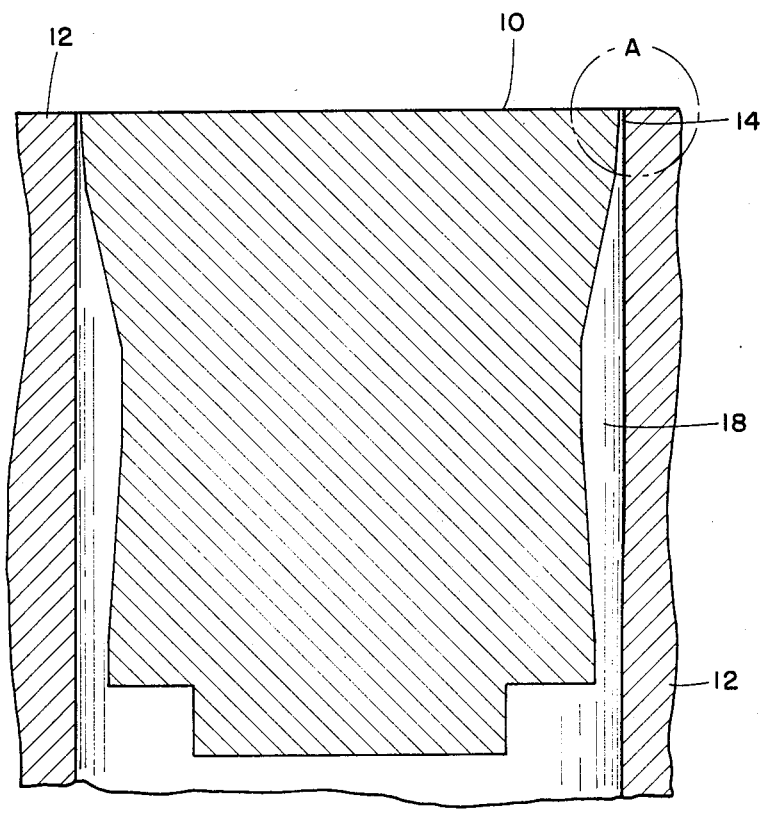
FIG. 1 is a simplified cross-sectional view showing the new mandrel in the die environment.
Figure 1A:
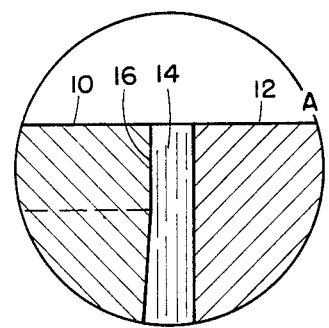
FIG. 1a is a magnification of a section of the mandrel (adjacent the die orifice) shown in FIG. 1.

Referring now in detail to the drawings, there is shown an extruder head for tubular blown film extrusion including a mandrel or die pin 10 provided within extruder die 12 defining a relatively large die gap 14 between the die and die pin. The die pin is configured as shown in magnification in FIG. 1a to provide a relatively short land length 16. Across the land length, the die passage is neither converging nor diverging, but rather parallels the die wall, thus the melt is neither constricted nor expanded, in the course of its flow to the die orifice, but stabilized. The mandrel or die pin also affords, in cooperation with the die, a relief area 18 in advance of the melt compression zone which allows the polymer melt to relax and distribute stresses prior to expression as film from the die orifice.

The inventive process thus incorporates melt relaxation and compression stages, followed by passage of the melt through a short stabilizing flow zone prior to expression as a tubular film through a relatively wide die gap.

In extruding LLDPE resin, increasing the die gap alone only marginally improves the extrusion characteristics, whereas implementing the remaining enumerated alterations improves film quality and bubble stability.

The die modifications may be readily and efficaciously accomplished merely by substituting in the die a newly configured die pin affording the characteristic geometry set forth above. Conventionally, such die pins are interchangeably mounted within the die and fixed in place with a cap screw, and may be replaced within an hour, including cooling and reheat times. Accordingly, considerable advantage is realized with attendant capital savings in utilizing the invention described, for LDPE, MDPE, HDPE and LLDPE resins may be run on the same equipment by the simple expedient of substituting selected die pins.

Figure 2:
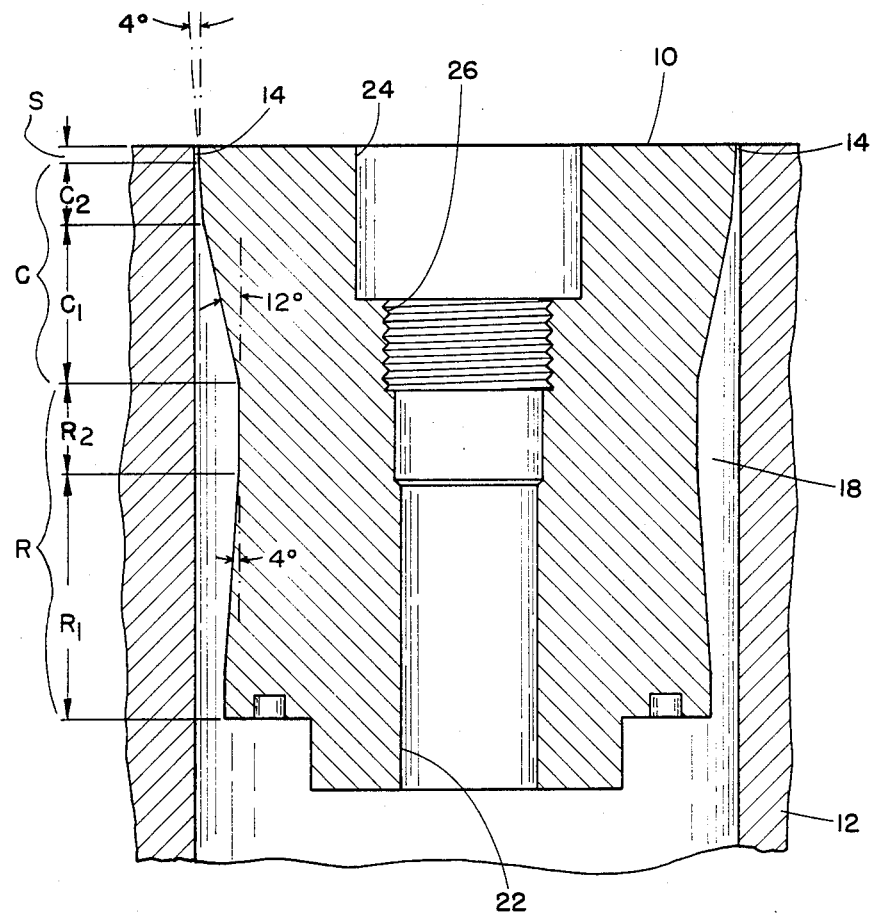
FIG. 2 is a cross-sectional view of the mandrel, or die pin, according to the teachings of the present invention.

The core or die pin of the invention is conveniently illustrated (without limitation) in the form adapted for use in conjunction with 1½ extruder employing a 3" die, as shown in FIG. 2. It is immediately seen that the pin provides a characteristic external geometry which co-operates with the cylindrical die opening to provide a tubular melt passage leading (in this illustration) from the bottom through, respectively, relaxation zone R, compression zone C, and stabilizing zone S to the orifice, at the top terminus. Relaxation zone R comprises a first, or expansion, stage $R_1$, which has an upwardly increasing width, and a second, or realignment, stage $R_2$, which has a uniform width. Compression zone C comprises first and second stages $C_1$ and $C_2$; and the width of these stages decreases upwardly, with the width of stage $C_1$ decreasing more rapidly than the width of stage $C_2$.

The die gap is greater than 0.75 inches, in this embodiment 0.082 inches, i.e., the die pin is machined, or manufactured to provide at the orifice, by reason of its O.D. relative to the fixed 3" die opening, a clearance or melt passage of 0.082 inches. The axial length of zone S is ⅛ inch and may be as small as 1/16 inch, the axial length of stage $C_2$ is approximately 21/64 inch, the axial length of stage $C_1$ is about 55/64 inch, the axial length of stage $R_2$ is about 7/16 inch, and the axial length of stage $R_1$ is approximately 1 5/16 inches. The side of die pin 10 that forms the inside surface of stage $R_1$ makes an angle of about 4° with the axis of the die pin, the side of that pin that forms the inside surface of stage $C_1$ makes an angle of approximately 12° with the axis of pin 10, and the side of the die pin that forms the inside surface of stage $C_2$ makes an angle of about 4° with the axis of the die pin. The die pin is provided conventionally with a central recess 22 having a threaded portion 24 to receive a cap screw (not shown) fixedly mounting the pin into the die opening.

It will be understood that the specific measurements set forth are for illustrative purposes only; actual values will vary essentially proportionately with conditions and equipment and may be selected by the artisan based upon the disclosed representative configuration. Thus, in a differently sized die, a proportionately reduced or enlarged die providing the same relative geometric configuration as illustrated here may be employed.

Extrusion conditions typical in the industry may be and preferably are employed to minimize necessity for any conversions in operation. The invention is particularly applicable to linear, low-density polyethylene of narrow molecular weight distribution, but the principles are equally adapted to serve in the case of any polymer of like rheological characteristics, e.g., low strain hardening polymers, such as the low pressure ethylene/$C_3$-$C_8$ alpha olefin copolymers. Filmmaking conditions likewise may be adopted from conventional practice without sacrificing the improved film quality and bubble stability achieved in accordance with the present invention.

The operation of an extruder fitted with the novel die pin in the extrusion of LLDPE is illustrated without limitation in the following Example.

EXAMPLE

Separate samples of LLDPE resins were converted to pellets on a standard 2½" extruder using a Maddox screw. Melt temperatures during finishing were held equal to, but no greater than, 400° F. by controlling the screw speed. The properties of the resin pellets are set forth in Table I.

TABLE I

| | Linear Low Density Resin Properties | | | | | | | | |
|---|---|---|---|---|---|---|---|---|---|
| | Resin #1 | Resin #2 | Resin #3 | Resin #4 | Resin #5 | Resin #6 | Resin #7 | Resin #8 | Resin #9 |
| Density (g/cc) | 0.9388 | 0.9335 | 0.9307 | 0.9288 | 0.9280 | 0.9236 | 0.9271 | 0.9244 | 0.9217 |
| Pellet Melt Index (g/10 min.) | 1.91 | 1.03 | 0.64 | 0.69 | 0.63 | 1.10 | 0.82 | 1.06 | 1.42 |
| Pellet HLMI (g/10 min.) | 76.4 | 42.5 | 21.4 | 20.8 | 19.7 | 49 | 25 | 34 | 46 |
| Viscosity (poise at $10^{-3}$ sec) | 3670 | 4360 | 3950 | 4000 | 3900 | 4150 | | | |

A 1½ Hartig type extruder equipped with a Gloucester bottom feed spiral die was utilized to prepare blown film from the pelletized polyolefin products. It was discovered that running the resins with a standard die gap of 0.028" produced only unsuccessful films. The films exhibited severe melt fracture and poor bubble stability. Increasing the die gap was found to only marginally improve the successful extrusion of the films. The surface of the films was found to be improved although not of commercial quality and the bubble stability remained a serious problem. However, by altering the configuration of the mandrel in a 3" die by increasing the die gap from 0.028 inches to 0.082 inches and simultaneously, decreasing the land length to 0.125 inches and additionally incorporating a relief area for the relaxation of the polymer melt, the quality and bubble stability of the films so produced was greatly improved.

The properties of films prepared are set forth in Table II.

are contemplated and can be made without departing from the broad spirit and scope of this invention as defined in the appended claims.

What is claimed is:

1. An apparatus for the extrusion of linear low density polyolefins comprising:
   an extruder die including a cylindrical inside surface forming a central opening; and
   a die pin held within the central opening and forming, with the extruder die, an extrusion inlet and an

TABLE II

Extruder Data and Linear Low Density Resins Blown Film Properties
(1½" Hartig Extruder with 3" Die 0.082" Die Gap)

|  | resin #1 | | resin #2 | | | resin #4 | | resin #5 | |
| --- | --- | --- | --- | --- | --- | --- | --- | --- | --- |
|  | sample 1 | sample 2 | sample 1 | sample 2 | resin #3 | sample 1 | sample 2 | sample 1 | sample 2 |
| Nominal Film Thickness (mils) | 2.0 | 1.0 | 2.0 | 1.0 | 2.0 | 2.0 | 1.0 | 2.0 | 1.0 |
| Blow Up Ratio | 2.1/1 | 2.1/1 | 2.1/1 | 2.1/1 | 2.1/1 | 2.1/1 | 2.1/1 | 2.1/1 | 2.1/1 |
| Melt Temperature (°F.) | 331 | 330 | 359 | 359 | 405 | 405 | 405 | 406 | 405 |
| Head Pressure (psig) | 3400 | 3400 | 3850 | 3850 | 4450 | 4500 | 4500 | 4800 | 4800 |
| Extruder Screw Speed (rpm) | 60 | 60 | 60 | 60 | 60 | 60 | 60 | 60 | 60 |
| Extruder Motor Load (amps) | 11.8 | 11.8 | 10.8 | 11.5 | 12.5 | 12.5 | 12.5 | 12.3 | 12.3 |
| Frost Line (inches) | 11 | 9.5 | 7 | 12 | 9 | 10 | 9.5 | 11 | 8.5 |
| Output (lbs/hr) | 23.9 | 24.0 | 18.2 | 21.7 | 22.6 | 23.5 | 23.5 | 22.4 | 23.0 |
| Cooling Air Temperature (°F.) | 38 | 38 | 39 | 39 | 38 | 38 | 38 | 37 | 37 |
| Drawdown (mils) |  |  |  | 0.1 |  |  | 0.2 |  |  |
| Film Impact Test Results |  |  |  |  |  |  |  |  |  |
| Dart Drop Test[1] (gms) | 83.1(2.2) | 10.5(1.1) | 92.1(2.2) | 44.9(1.3) | 81.0(2.0) | 94.3(2.2) | 38.1(2.1) | 108.6(2.1) | 36.0(1.0) |
| Ball Burst Test[2] (cm-kg) | 2.11(2.2) | 1.4(1.0) | 3.94(2.2) | 2.48(1.2) | 4.26(2.0) | 5.64(2.0) | 3.14(1.0) | 6.5(2.3) | 3.42(1.0) |

|  | resin #6 | | resin #7 | | resin #8 | | |
| --- | --- | --- | --- | --- | --- | --- | --- |
|  | sample 1 | sample 2 | sample 1 | sample 2 | sample 1 | sample 2 | resin #9 |
| Nominal Film Thickness (mils) | 2.0 | 1.0 | 2.0 | 1.0 | 2.0 | 1.0 | 2.0 |
| Blow Up Ratio | 2.1/1 | 2.1/1 | 2.1/1 | 2.1/1 | 2.1/1 | 2.1/1 | 2.1/1 |
| Melt Temperature (°F.) | 360 | 360 | 360 | 360 | 360 | 360 | 360 |
| Head Pressure (psig) | 3900 | 3900 | 4100 | 4100 | 4300 | 3900 | 3800 |
| Extruder Screw Speed (rpm) | 60 | 60 | 60 | 60 | 60 | 60 | 60 |
| Extruder Motor Load (amps) | 12.5 | 12.3 | 11 | 11 | 12.5 | 11.5 | 12 |
| Frost Line (inches) | 9 | — | 9.5 | 8.5 | 10.5 | 6 | 9.5 |
| Output (lbs/hr) | 24.9 | 24.0 | 16.7 | 17.8 | 21.6 | 21.3 | 25.6 |
| Cooling Air Temperature (°F.) | 40 | 40 | 39 | 39 | off | 40 | off |
| Drawdown (mils) | — | 0.2 | — | 0.1 | — | 0.15 | — |
| Film Impact Test Results |  |  |  |  |  |  |  |
| Dart Drop Test[1] (gms) | 84.6(2.5) | 42.6(1.2) | 103.3(2.4) | 55(1.3) | 134.1(2.2) | 41(1.0) | 151.5(2.3) |
| Ball Burst Test[2] (cm-kg) | 6.62(2.4) | 3.62(1.2) | 5.48(2.2) | 3.04(1.2) | 6.68(2.3) | 3.64(1.1) | 3.64(1.1) |

[1] The weight at which a dart, free falling from 26", just causes fracture of a film specimen. Figure in parenthesis is the measured film thickness in mils.
[2] The average energy required to break a square 4" × 4" specimen of the film by a spherical ball having a 0.5" radius swinging at the end of a pendulum. Figure in parenthesis is the measured film thickness in mils.

An examination of the film indicated that consistently good quality film was produced. Film imperfections were held to a minimum and drawdown (thinnest obtainable film) was achieved down to 0.0001 inch. A consistently high quality film appearance was obtained. This invention had no detrimental effect on the fim appearance, and in fact tended to result in an improved appearance. The frost line was maintained steadily at a consistent distance from the die face, evidencing smooth running and good bubble stability without melt fracture or splitting, even at these throughput rates.

From the foregoing, it is apparent that the objects of the present invention have been fully accomplished As a result of the present invention, a novel apparatus and process for the extrusion of polyolefin materials has been disclosed, permitting LLDPE resins to be extruded at conditions normally used to blow high pressure low density and high density (linear) polyethylenes.

Although a preferred embodiment of the principles of this invention has been described and illustrated in detail for convenience herein, it should be realized that the invention is not limited to the particular configuration shown in the drawings, and that modifications thereof extrusion outlet, the die pin including
  (i) a back outside surface including a forwardly inwardly extending surface portion,
  (ii) an intermediate outside surface located immediately forward of the back outside surface, and including a forwardly outwardly extending surface portion, and
  (iii) a forward, outside cylindrical surface located immediately rearward of the extrusion outlet and immediately forward of the outwardly extending surface portion of the intermediate surface;
the inside surface of the extruder die and the back outside surface of the die pin forming a relaxation zone to receive a polyolefin conducted through the extrusion inlet and to relieve stresses in the polyolefin;
the inside surface of the extruder die and the intermediate outside surface of the die pin forming a compression zone to receive the polyolefin from the relaxation zone and to compress the polyolefin into a tubular shaped film; and
the inside surface of the extruder die and the upper cylindrical surface of the die pin forming a stabilization zone to receive the polyolefin from the compression zone, to stabilize the shape of the tubular film, and to conduct the tubular film to the extrusion outlet; the stabilization zone being located immediately rearward of the extrusion outlet, having a length less than 0.20 inches, and a width, uniform over its entire length, greater than 0.075 inches.

2. Apparatus according to claim 1 wherein the stabilization zone has a length substantially equal to 0.125 inches.

3. Apparatus according to claim 1 wherein the stabilization zone has a width substantially equal to 0.082 inches.

4. Apparatus according to claim 3 wherein the stabilization zone has a length substantially equal to 0.125 inches.

5. Apparatus according to claim 4 wherein the polyolefin comprises polyethylene resin.

6. A process for forming blown film from an extrudate of linear low density polyolefin material, the process comprising the steps of:

melting the polyolefin material at a temperature not exceeding 400° F.; and passing the polyolefin material through an extruder including an extruder die and a die pin, the extruder die including a cylindrical inside surface forming a central opening, the die pin being held within the central opening and forming, with the extruder die, an extrusion inlet and an extrusion outlet, the passing step including the steps of:
(i) passing the polyolefin material forward from the extrusion inlet and through a relaxation zone, the relaxation zone including a portion having a forwardly increasing volume to relieve stresses in the polyolefin,
(ii) passing the polyolefin material forward from the relaxation zone and through a compression zone, the compression zone including a portion having a forwardly decreasing volume to compress the polyolefin into a tubular shaped film,
(iii) passing the polyolefin material forward from the compression zone and through a stabilization zone, the stabilization zone being located immediately forward of said portion of the compression zone, the stabilization zone having a length less than 0.20 inches, and a width, uniform over its entire length, greater than 0.075 inches, and
(iv) passing the polyolefin material forward from the stabilization zone and through the extrusion outlet, the extrusion outlet being located immediately forward of the stabilization zone.

7. A process according to claim 6 wherein:

the passing step includes the step of passing the polyolefin material through a spiral die body; and the relaxation zone includes a relief area to allow the polyolefin material to relax after passing through the spiral die body.

* * * * *